UNITED STATES PATENT OFFICE.

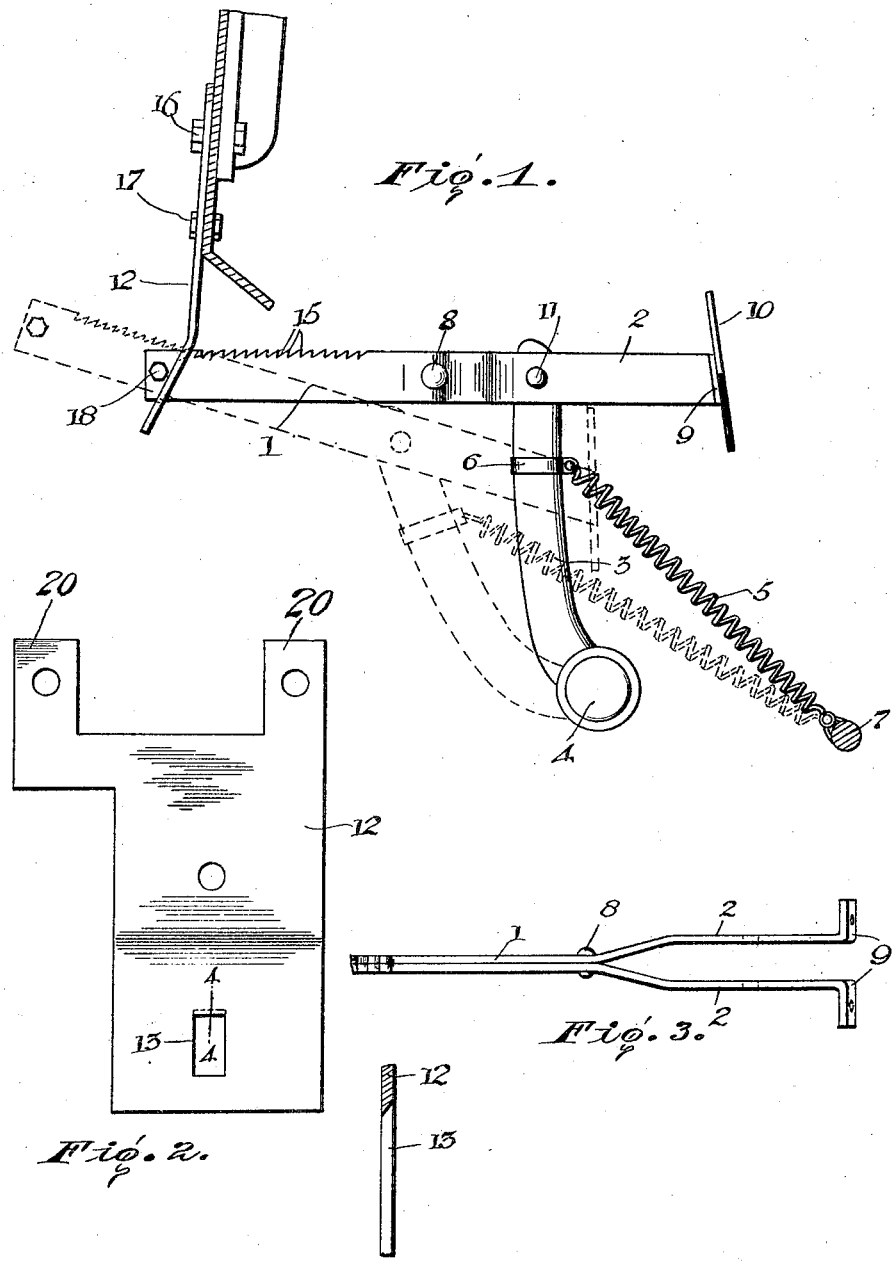

DALE WILLIS NEWBERRY, OF VIRGINIA, ILLINOIS.

MOTOR-CAR ATTACHMENT.

1,402,883. Specification of Letters Patent. Patented Jan. 10, 1922.

Application filed April 13, 1920. Serial No. 373,512.

*To all whom it may concern:*

Be it known that I, DALE WILLIS NEWBERRY, a citizen of the United States, and a resident of Virginia, in the county of Cass and State of Illinois, have invented certain new and useful Improvements in Motor-Car Attachments, of which the following is a specification.

My invention is an improvement in motor car attachments, and has for its object to provide an attachment of the character specified especially adapted for use with Ford cars and for attachment to the clutch and low speed pedal, for locking the transmission in the low speed when desired, as, for instance, in climbing hills or in traversing mud, sand or the like, so that the driver does not need to hold the pedal in operative position with his foot.

In the drawings:

Figure 1 is a side view showing the attachment in place;

Figure 2 is a front view of the latch plate;

Figure 3 is a top plan view of the attachment detached;

Figure 4 is a section on the line 4—4 of Figure 2.

In the present embodiment of the invention the attachment comprises a lever, which is of substantially Y-shape, consisting of a body 1 and arms 2, the arms being spaced apart far enough from each other to receive between them the body 3 of the pedal, which controls the clutch and low speed, the said pedal body being secured to the usual shaft 4, and being normally drawn into inoperative position by the spring 5.

This spring is arranged between a collar 6 on the pedal body and a fixed member 7, which may be part of the body of the vehicle. The lever 1—2 is formed by superposing two strips of metal of suitable weight upon each other and riveting them together intermediate their ends, as indicated at 8. On one side of the rivet the strips are bent away from each other to form the arms 2, and at their free ends each arm 2 has an outwardly extending lug 9, the said lugs being in alinement, and being perforated to permit the attachment of a foot plate 10 which connects the lugs.

Each arm 2 has a transverse opening intermediate the rivet 8 and the lug 9, and these openings are adapted to receive a rivet or pin 11 for pivotally connecting the lever to the pedal body, the arms 2 of the lever being arranged on opposite sides of the pedal body. The lever is thus free to swing on the pedal body, but it is limited in its swinging movement by means of a latch plate 12. This latch plate has a slot or opening 13 through which the body 1 of the lever 1—2 is movable, and, referring especially to Figure 4, it will be noted that the upper end of this slot is beveled. The body 1 of the lever has a series of teeth 15 in its upper edge which face toward the foot plate 10, and these teeth are adapted to engage the beveled end of the slot or opening 13, to hold the lever 1—2 with the pedal in adjusted position.

The latch plate 11 has upwardly extending lugs 20 at its top, and these lugs are provided with openings, as shown, for receiving holding bolts 16, for connecting the plate to the body of the vehicle at a suitable point. The body of the plate 12 also has an opening at about its center for receiving a bolt 17 which assists in holding the latch plate to the body.

A stop bolt 18 is passed transversely of the lever 1—2 at the end remote from the foot plate 10, the said stop bolt being designed to engage the forward face of the latch plate 12 to prevent entire withdrawal of the lever 1—2 from the slot or opening 13. The spring 5, acting as it does, to normally draw the lever 1—2 rearwardly, insures the engagement of the teeth 15 with the beveled upper end of the slot 13.

In operation, when it is desired to hold the car in the low speed the pedal 3 is pushed forwardly by means of the foot and the foot plate 10. Since the teeth 15 are ratchet teeth, facing the foot plate 10, they will slip idly over the beveled edge of the opening 13 and the lever and pedal will assume the broken line position of Figure 1. The teeth, by their engagement with the beveled end of the slot 13, when the pedal is released, will prevent backward movement of the pedal, and the car will be held in the low speed until the lever is released. The lever is released merely by pushing on the foot plate and swinging the forward end of the lever slightly downwardly. A slight rocking of the foot on the foot plate will release the teeth from the end of the slot.

I claim:

1. The combination with a straight arm inclusive of two lengths of metal having their opposed sides flatly in contact and their rear portions arranged in spaced relation and formed with oppositely directed lugs, of a foot plate rigidly secured to said lugs, a pedal having its upper portion located between and pivoted to the spaced portions of said length of metal, and means to secure said arm in an adjusted position.

2. The combination with a straight arm having its rear portion formed with a pair of spaced parallel branches having laterally projecting lugs, of a foot plate rigidly secured to said lugs, a pedal having its upper portion located between and pivoted to the spaced portions of said arm, a spring associated with said pedal for urging the same rearwardly, the upper edge of said arm being provided at its forward portion with teeth, and a latch member engaged with said teeth for securing said arm in position.

3. The combination with a straight arm having its rear portion formed with a pair of spaced parallel branches having laterally projecting lugs, of a foot plate rigidly secured to said lugs, a pedal having its upper portion located between and pivoted to the spaced portions of said arm, a spring associated with said pedal for urging the same rearwardly, the upper edge of said arm being provided at its forward portion with teeth, a latch member engaged with said teeth for securing said arm in position, and a stop element secured to the forward portion of said arm and arranged in the path of travel of said latch member.

DALE WILLIS NEWBERRY.